March 29, 1960  R. F. BANNOW ET AL  2,930,291
Hinge Jointed Adapter
Filed Oct. 6, 1953

INVENTORS
Rudolph F. Bannow
Magnus Wahlstrom
ATTORNEY

United States Patent Office 2,930,291
Patented Mar. 29, 1960

2,930,291

HINGE JOINTED ADAPTER

Rudolph F. Bannow and Magnus Wahlstrom, Easton, Conn., assignors to The Bridgeport Machines, Inc., Bridgeport, Conn., a corporation of Connecticut Application October 6, 1953, Serial No. 384,442

4 Claims. (Cl. 90—17)

This invention relates to adapters involving hinge joint construction suited to supporting a self powered work machining unit in adjustable angular positions on some projecting portion of a machine frame such as the overarm of a conventional milling machine.

The present improvements are particularly concerned with a hinge joint type of adapter such as disclosed in United States Patent No. 2,275,291. A modified form of hinge joint adapter is shown in another United States Patent 2,404,561.

Hinge jointed adapters such as those of the above mentioned patents depend on the clamping power of a single stud or bolt that serves as the hinge pin of the joint for preventing accidental disturbance of the angular setting of the relatively swingable parts of the joint. Such adapters make use of a forked arm or yoke as one member of the hinge joint which straddles the other member of the joint.

It is an object of the present improvements to retain the desirable compactness and sturdiness of the patented constructions above referred to while greatly strengthening the holding power with which the relatively swingable members of the joint are maintained in various angular positions to which they may selectively be adjusted.

A contributory object is to avoid dependence on the clamping force of a single hinge pin bolt as a means for maintaining angular adjustment especially when the adapter is so set angularly that the axis of the hinge pin is directed horizontally.

A further object is to retain compactness and sturdiness in the structure of hinge joint adapters as heretofore known while newly incorporating within at least one of the two arms of the yoke member of the joint adjustive gearing by means of which the angular relationship of the joint members can be varied at will with fine precision and with sufficient leverage to make the joint easy to adjust even while burdened with unbalanced weighty portions of a supported machining attachment.

A still further object is so to incorporate the adjustive gearing in the joint construction that it is easily accessible for inspection, replacement, repair and lubrication.

A specific object is to incorporate in the adjustive gearing a worm and worm wheel by means of which turning movement can be transmitted from an applied wrench or crank handle to worm actuating shaft terminals that are freely accessible outside of the adapter in all adjusted positions of its hinged members, such gearing being so located and arranged that forces manually imparted thereto are applied at the root ends of the yoke arms where there is least spring and greatest rigidity in their structure.

A still further object is to stay the joint adjustment with greater rigidity than heretofore by the use of a plurality of individual fastening means spaced about and away from the pivotal axis of the joint.

These and other objects of the invention will become evident in greater particular as the following description of a successful embodiment of the improvements proceeds having reference to the accompanying drawing wherein:

Figs. 1 and 2, respectively, are a fragmentary top plan view and a side view of a machine tool incorporating a hinge jointed adapter in which the present improvements are embodied.

Figure 1:
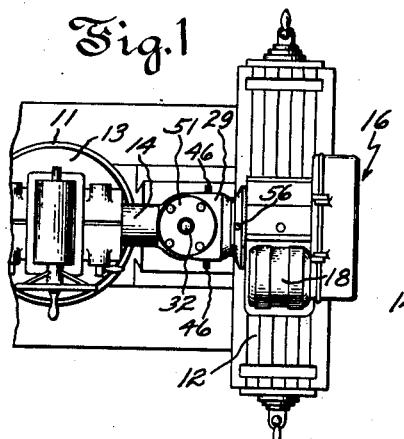
Figure 4:
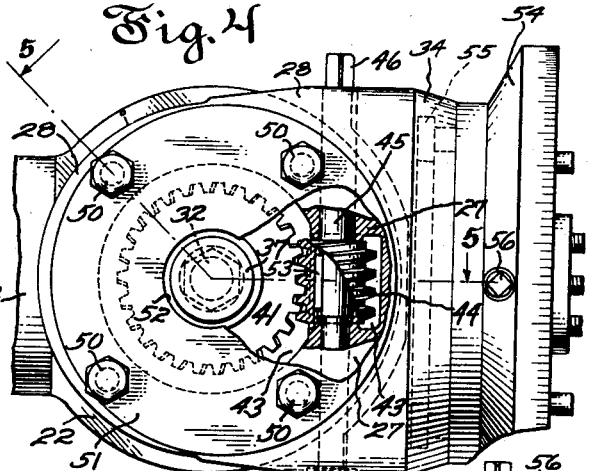
Fig. 4 is a view similar to Fig. 3 showing parts broken away to expose the internal gearing.
Figure 2:
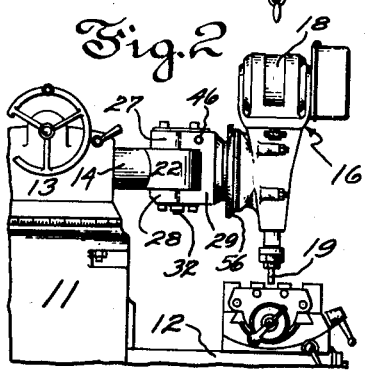
Figures 3, 5:
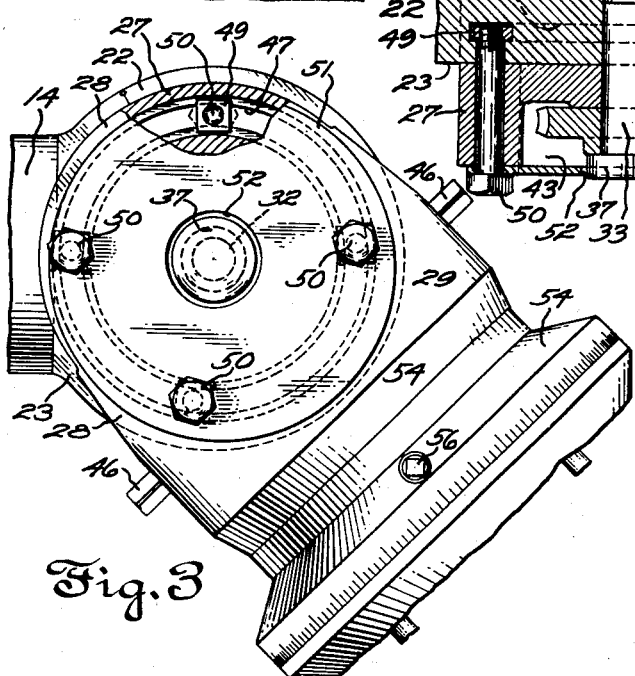
Fig. 3 is an enlarged plan view of the adapter with its members set at an angle, parts being broken away and shown in section on the plane 3—3 in Fig. 5 looking in the direction of the arrows.
Fig. 5 is a view taken partially in section on the planes 5—5 in Fig. 4 looking in the direction of the arrows.

To illustrate a practical use for the herewith improved adapter it is shown in Figs. 1 and 2 as forming part of articulated support structure for a work machining unit 16 and attached thereby to a conventional type of horizontal milling machine having among its basic parts the frame standard 11, the turret head 13 topping the machine standard, and the overarm 14 projecting from the turret head to a position over the work supporting table 12 of the milling machine. The work machining unit 16 is shown to be supported directly by the improved adapter and is powered by a motor 18 carried thereby which drives a rotary milling tool 19 adapted to operate upon work carried by table 12.

For most of its length overarm 34 is cylindrical. It is mounted in the turret head in a manner to be turnable about its own axis to rotary positions displaced any number of degrees within a complete revolution from its position shown in Figs. 1 and 2 and may be fixed in any of such positions by means of mechanism sparsely represented herein but shown in full detail in the aforesaid Patent 2,275,291. The free end 22 of overarm 34 is widened and is provided with flat bearing faces 23, 24. This widened free end of the overarm may be regarded as the tongue member of the hinge joint. Its bearing faces 23, 24 are flanked respectively by mating internal bearing faces 25 on the arms 27, 28 of the yoke member 29 of the hinge joint. Arms 27, 28 have root ends adjoining the body portion of yoke member 29 and straddle the tongue member or end of the overarm much as in the earlier corresponding constructions above referred to.

A hinge pin in the form of bolt 32 rotatively fits and extends through axially aligned holes in yoke arms 27, 28 and also through an intermediate, partly oversize bore 30 in the tongue member. Bolt 32 is of relatively large diameter 33 in one portion of its length and has another portion 34 of reduced diameter threaded at 35 to receive an external retaining nut 36 and its thrust washer 38.

The larger end 33 of bolt 32 has a free rotary fit in yoke arm 27 and has a snug sliding fit in that end portion of the overarm bore 30 that is adjacent thereto. This larger portion of the bolt is splined to the tongue member 34 by means of a key 40. The remaining length of hinge bolt 32 preferably is given considerable clearance throughout the remaining length of bore 30.

The head 37 of bolt 32 retains upon the larger end of the bolt a worm gear 41 which also is splined to the bolt 32 by means of a key 42. Thus worm gear 41 is always interlocked in rotatably fixed, but freely slidable, relation to the overarm 14 through the medium of hinge bolt 32. The arm 27 of yoke 29 is sandwiched therebetween and is free to swivel relatively thereto when relative swinging movement takes place between joint members 22 and 29.

Worm gear 41 is located in a chamber 43 that is cored in yoke arm 27, as also is its driving worm 44 with which it constantly meshes. Worm 44 is fixed by means of a key 53 on a cross shaft 45 that is journaled near its ends in rotary bearings in the root end of yoke arm 27.

Shaft 45 projects outside of the adapter structure at each side of the yoke so that its squared ends 46 are exposed to receive and be turned by a hand crank or wrench (not shown) for rotating the worm. The hollow 43 is covered by a protective plate 51 that is removable to give free access to the gearing when bolts 50 are removed from yoke arm 27. A central aperture 52 in cover plate 51 permits removal of hinge bolt 32 therethrough without disturbing the cover plate.

To stay the relative angular setting of the joined members 22 and 29 with greater firmness than has heretofore been proposed in the construction of relatively compact adapters for adjustably supporting self-powered work machining attachments, the present improvements incorporate an annular groove 47 having a T-shaped cross section and a similar annular groove 48, respectively undercut in the faces 23 and 24 of the joint member 22. Square nuts 49, having threaded engagement with holding bolts 50, occupy grooves 47 and 48 in registering positions with the bolt ends and fit the slots so as to be prevented from turning with the bolts. Provision for the admittance of the nuts into their grooves can be as shown in Fig. 8 of the drawings of United States Patent No. 2,275,291 hereinbefore referred to, and is not herein specifically illustrated.

The disc-like enlarged flange 54 of yoke 29, as in the aforesaid Patent 2,404,561, is provided with an annular T-shaped groove 55 that can be made use of in connection with locking the work machining attachment in various angular positions relative to yoke 29 and to which positions it may be turned by internal adjustive gearing that is actuated by means of exposed shaft squares 56 as fully disclosed in the patent last referred to.

During a work machining operation the eight fastening bolts 50 will remain tightened. When it is desired to change the angular relation of joint members 22 and 29, these bolts will be loosened but the yoke 29 will remain locked against swinging relatively to overarm end 22 by the engagement of worm gear 41 with the teeth of worm 44. A wrench or hand crank (not shown) is then applied to the most easily reached of the squared ends 46 of the worm shaft. When turned thereby the worm with considerable leverage will work its way around the worm wheel like a planet gear, the worm wheel meanwhile remaining stationary because rotatively interlocked with the end 22 of overarm 14. This action of the gearing swings the yoke 29 and its supported work machining unit 16 into selected angular relation to the overarm after which the stay bolts 50 are again tightened to maintain the adjustment with great firmness and holding strength preventing accidental loosening and chattering of the tool against the work. This greater firmness of holding power is particularly needed when the overarm 14 is shifted 90 degrees abouts its own axis away from its rotary positions shown in Figs. 1 and 2 so that the axis of the hinge pin 33 is directed horizontally, because the weight of the machining attachment 16 then exerts the greatest tendency to cause relative swinging of yoke member 29 about the axis of the hinge pin.

The following claims are directed to and intended to cover all substitutes and equivalents for the exact shapes and arrangements of parts herein disclosed which fairly come within the broadest interpretation of the terms used in the claims.

We claim:

1. A hinge jointed adapter for supporting a swingable self powered work machining unit in various fixed angular positions and shifting it selectively therebetween, comprising in combination, a tongue member, a yoke member having a body portion and spaced arms adjoining and extending therefrom to straddle said tongue member, one of said arms being hollow, a hinge pin extending crosswise through said tongue rotatively interlocked therewith and slidable axially in relation thereto having its opposite end portions journaled respectively in said arms, screw threads on one of said end portions of the hinge pin, a worm gear rotatively interlocked with one of said end portions of said hinge pin and slidable axially in relation thereto within the hollow of one of said arms, a retaining head of enlarged diameter on the end portion of said hinge pin remote from said threads adapted to afford a thrust for axially drawing said worm gear toward said tongue member, a draw nut on said threads of the hinge pin at the opposite side of said tongue member from said worm gear whereby in cooperation with said head a thrust is exerted to draw said worm gear, said yoke arm and said tongue member toward one another into tightly clamped relationship, and a worm in mesh with said worm gear within said hollow of said arm pivotally supported in the latter and accessible outside of said arm for turning said worm when said draw nut is loosened, whereby to shift the work machining unit to various angular positions.

2. A hinge jointed adapter as defined in claim 1, in which only a partial thickness of the said one of the said yoke arms lies between and separates the said tongue member and the said worm gear.

3. A hinge jointed adapter as defined in claim 1, in which the said hollow in the said one of the said yoke arms opens to the outside of the arm, together with a plate removably mounted on and fitting the borders of the outward opening of said hollow in a manner substantially to cover said hollow, thereby to protect as well as render accessible the said worm and worm gear.

4. A hinge jointed adapter as defined in claim 1, in which the said retaining head of the said hinge pin abuts against the said worm gear.

References Cited in the file of this patent

UNITED STATES PATENTS

| 544,216 | Droste | Aug. 6, 1895 |
| 1,886,699 | Larson | Nov. 8, 1932 |
| 1,968,362 | West | July 31, 1934 |
| 2,190,741 | Sylvester | Feb. 20, 1940 |
| 2,275,291 | Bannow | Mar. 3, 1942 |
| 2,404,561 | Bannow | July 23, 1946 |

FOREIGN PATENTS

| 825,143 | Germany | Dec. 7, 1951 |